T. F. McEVILLY.
LOCKING DEVICE.
APPLICATION FILED SEPT. 30, 1918.

1,310,627.

Patented July 22, 1919.

Witnesses,
E. E. Reichart
Augustus B. Copper

Inventor,
Thomas F. McEvilly
By Joshua R. H. Potts
his Attorney

UNITED STATES PATENT OFFICE.

THOMAS FRANCIS McEVILLY, OF WILMINGTON, DELAWARE.

LOCKING DEVICE.

1,310,627.  Specification of Letters Patent.  Patented July 22, 1919.

Application filed September 30, 1918. Serial No. 256,187.

*To all whom it may concern:*

Be it known that I, THOMAS F. McEVILLY, a citizen of the United States, residing at Wilmington, in the county of New Castle and State of Delaware, have invented certain new and useful Improvements in Locking Devices, of which the following is a specification.

One object of my invention is to provide a device which will lock a gas hose to its connection with a gas supply pipe so that the hose will not accidentally fall therefrom and so that the hose cannot be detached from its connection until the locking device is moved.

Another object is to so make my invention that it will be of simple construction and can be easily manipulated both for attachment and removal from a gas pipe and valve.

These objects, and other advantageous ends which will be described hereinafter, I attain in the following manner, reference being had to the accompanying drawings in which—

Figure 1:
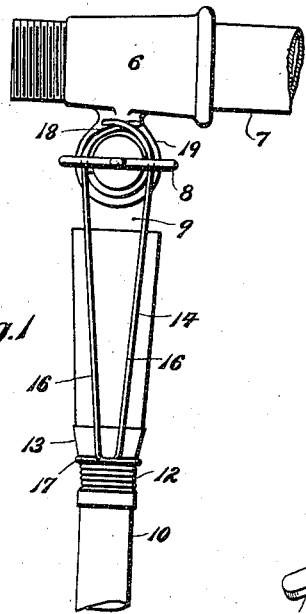
Figure 2:
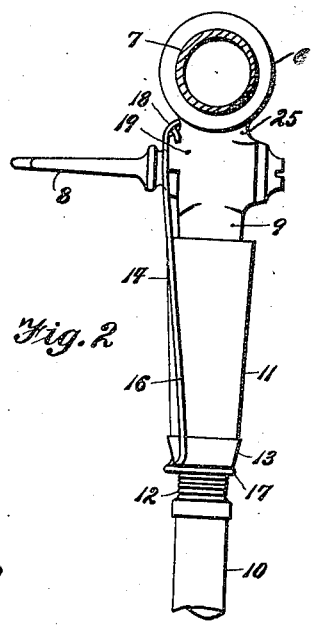
Figure 3:
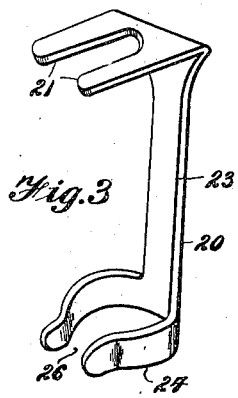
Figure 4:
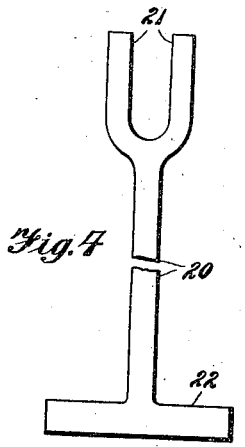
Figure 5:
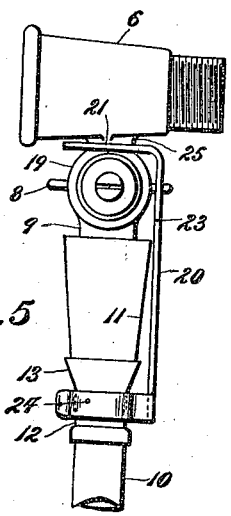

Figure 1 is a side elevation of my invention, showing the same as it appears when locking a gas hose to a gas cock, Fig. 2 is a side elevation of Fig. 1, Fig. 3 is a perspective view of a modification of my improved locking means, Fig. 4 is a view showing how a blank can be stamped out of sheet metal to produce the locking device shown in Fig. 3, and Fig. 5 is an end elevation showing how the form of my invention shown in Fig. 3 is operative.

Referring to Figs. 1 and 2, 6 represents a gas cock of usual construction which is attached to a gas supply pipe 7 and is provided with the usual valve stem 8 and nipple 9. A gas hose 10 has a flexible rubber end 11 and a metallic ferrule 12 which serves as a reënforcement for the hose. This ferrule has an enlargement 13, as is usually provided, which is flared outwardly, as clearly illustrated in the drawings.

My improved locking device 14, as illustrated, is made of a single piece of wire, the leg portions 16 of which are bent to provide an eyelet 17 which extends in a plane substantially at right angles to a plane including the length of the leg portions 16.

The eyelet 17 extends more than three hundred and sixty degrees (360°), or, in other words, is in the form of a spiral so that its portions adjacent the leg portions 16 cross each other.

The normal diameter of the eyelet 17 is substantially the same as the diameter of the enlargement 13.

The upper ends 18 of the leg portions 16 are hook shape and extend in opposite directions to each other so as to overlap, as clearly shown in Fig. 1. These end portions are adapted to be sprung around the boss 19 of the cock 6 and when so located the leg portions 16 and eyelet 17 serve as suspension members for holdnig the rubber end 11 on the nipple 9 and thereby preventing accidental displacement of the rubber end.

I preferably make my improved device 14 of resilient steel wire so that the eyelet will normally move into the position illustrated. However, it will be noted that by squeezing or moving the leg portions 16 together adjacent the eyelet 17, the eyelet will be increased in diameter and when the diameter becomes greater than the enlargement 13 the eyelet can be slipped from the ferrule 12 and from the rubber end 11 to remove the device from the hose 10.

If desired, the end portions 18 can be rendered flexible and non-resilient so that they can be readily bent into the shape illustrated.

In Figs. 3 to 5, inclusive, I have shown a modification of my invention in which I can make my improved locking device 20 out of sheet metal stamped by a punch or cut by other suitable means, the same including a forked end 21 and an inverted T end 22.

The forked end 21, as clearly shown in Fig. 3, is bent at right angles to the central portion 23 and the end 22 is bent in the form of a substantially U-shape split eyelet or band 24, this band being adapted to embrace the ferrule 12 of the hose 10. This forked end 21 is adapted to span the neck 25 of the cock 6.

The band 24 is preferably rendered resilient so that it can be forcibly pulled laterally from the ferrule 12, the opening 26 of said band being normally smaller than the smallest diameter of the enlargement 13 which requires that when applying the device that force be applied to spread the sides of the band to permit it to slip over said ferrule.

In each of the forms of my invention it is the cock which forms the supporting structure for the locking device. In the form shown in Figs. 1 and 2 the boss 19 serves as the immediate connection for the device, while in the forms shown in Figs. 3 to 5 it is the neck 25 which provides the direct support for the locking device.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A device for locking a hose to a fixture, including a continuous piece of wire having an eyelet bent within its length, said eyelet having overlapping portions, and leg portions bent from said overlapping portions and spaced apart, said leg portions extending at an angle to a plane including said overlapping portions, said leg portions having free ends curved so as to embrace said fixture, said eyelet being of a normal diameter sufficient to embrace said hose but expansible, when said leg portions are moved together, to a diameter greater than that of the hose whereby the eyelet can be freely slid longitudinally off the hose; substantially as described.

2. A device for locking a hose to a fixture, including a continuous piece of wire having an eyelet bent within its length, said eyelet having overlapping portions, and leg portions bent from said overlapping portions and spaced apart, said leg portions extending at an angle to a plane including said overlapping portions, said leg portions having free ends curved toward each other so as to embrace said fixture, said eyelet being of a normal diameter sufficient to embrace said hose but expansible, when said leg portions are moved together, to a diameter greater than that of the hose whereby the eyelet can be freely slid longitudinally off the hose; substantially as described.

3. A device for locking a hose to a fixture, including a continuous piece of wire having an eyelet bent within its length, said eyelet having overlapping portions, and leg portions bent from said overlapping portions and spaced apart, said leg portions extending at an angle to a plane including said overlapping portions, said leg portions having free ends curved to overlap each other so as to embrace said fixture, said eyelet being of a normal diameter sufficient to embrace said hose but expansible, when said leg portions are moved together, to a diameter greater than that of the hose whereby the eyelet can be freely slid longitudinally off the hose; substantially as described.

In testimony whereof I have signed my name to this specification in the presence of two subscribing witnesses.

THOMAS FRANCIS McEVILLY.

Witnesses:
  WM. E. HAWKINS,
  CHARLES T. HARTMAN.

Copies of this patent may be obtained for five cents each, by addressing the "Commissioner of Patents, Washington, D. C."